Patented Feb. 7, 1939

2,146,034

UNITED STATES PATENT OFFICE 2,146,034

LAMINATED ARTICLE AND PROCESS OF MAKING SAME

John P. Sermattei, New Brunswick, N. J., assignor to E. I. du Pont de Nemours & Company, Wilmington, Del., a corporation of Delaware No Drawing. Application February 5, 1935, Serial No. 5,069

5 Claims. (Cl. 154—40)

This invention relates to adhesive compositions and more particularly to thermoplastic compositions comprising cellulose nitrate and a solvent-plasticizer.

Heretofore thermoplastic cements have been dependent for their thermoplastic and adhesive properties on the presence in the composition of resins which soften and become sticky and adhesive on being heated and later regain their hardness when allowed to cool, thus forming the bond between the materials being joined. In these thermoplastic adhesive compositions there is a tendency for the development of brittleness when subjected to reduced temperatures due to the large resin content of the adhesive, thereby weakening the bond. Softeners are sometimes used in these compositions but the high resin content still has a tendency to make them brittle at reduced temperatures.

An object of the present invention is to provide a thermoplastic adhesive composition which is not dependent for its thermoplastic and adhesive properties on the presence in the composition of either natural or synthetic resins. A further object is to provide a thermoplastic adhesive composition which does not require a high temperature to soften it and which does not change its composition during the heat treatment, thus eliminating the so-called "curing" of the adhesive.

In order to illustrate the invention the following examples of compositions are given:

Example 1

| | Percent by weight |
|---|---|
| Cellulose nitrate | 10 |
| Tricresyl phosphate | 20 |
| Ethyl acetate | 21 |
| Denatured alcohol | 21 |
| Toluene | 28 |

Example 2

| | |
|---|---|
| Cellulose nitrate | 10 |
| Triphenyl phosphate | 20 |
| Ethyl acetate | 21 |
| Denatured alcohol | 21 |
| Toluene | 28 |

Example 3

| | |
|---|---|
| Cellulose nitrate | 10 |
| Dibutyl phthalate | 17.0 |
| Ethyl acetate | 21.9 |
| Denatured alcohol | 21.9 |
| Toluene | 21.2 |

Example 4

| | Percent by weight |
|---|---|
| Cellulose nitrate | 10.0 |
| Triphenyl phosphate | 8.0 |
| Ethyl acetate | 24.6 |
| Denatured alcohol | 24.6 |
| Toluene | 32.8 |

The viscosities given throughout this specification are measured in accordance with the method outlined in the A. S. T. M. Tentative Specifications and Tests for Soluble Nitrocellulose, Designation D-301-30T.

The viscosity of the cellulose nitrate in the examples given above may vary from 2 sec. up to 80 sec. However, for special purposes, I may use cellulose nitrate having a viscosity of ¼ sec. or, on the other hand, I may use cellulose nitrate having a viscosity of 100 sec. or even higher. This is a matter which will be apparent to those skilled in the art.

The preparation of the adhesive compositions in the examples above is carried out substantially in the following manner:

The so-called nonsolvents or diluents, as toluene and denatured alcohol, are first added to the cellulose nitrate in order to wet it, then the active cellulose nitrate solvents are added and then the solvent softener. The mass is thoroughly agitated and when complete dispersion is obtained, it is ready for use. The compositions described in the above examples are substantially transparent and nearly water white.

These adhesives can be applied in the usual manner either by brush, dipping, spraying, or by roller coating procedures. After the adhesive is applied to the articles which are to be adhered, the volatile solvents and diluents are allowed to evaporate until the film is dry. Materials thus treated are then brought into contact with each other and subjected to pressure at an elevated temperature either in a press, between rolls, or by means of a hot iron. Only a slight pressure is necessary, 2 to 15 lbs. per square inch being sufficient, although greater pressure can be used if desired. A satisfactory working temperature range is between 130 and 200° C. Further details with regard to adhering the surface will be readily evident to those versed in the art of combining materials.

In cementing two objects together it is not necessary to apply the adhesive and then stick the two objects together at once. The adhesive may be applied and then allowed to dry in which condition it will remain indefinitely. When it is desired to cement the two objects together, they are warmed and pressed together as suggested above. The films of adhesive when warmed begin to soften and when brought in contact with each other become one, and then on cooling again, the film returns to its tenacious, flexible and nontacky condition.

The preferred compositions in the examples given cover a range of 10 parts of cellulose nitrate to 8-30 parts of solvent-plasticizer, however a greater or lesser amount of solvent-plasticizer may be used with the cellulose nitrate, although it has been found that the range mentioned gives the most satisfactory results.

The active solvents and the diluents for the cellulose nitrate play no part in the final use of the adhesive but merely act as a means for suitably dispersing the cellulose nitrate so that it can form a mixture with the solvent-plasticizer. The amount of active solvent and the diluent can be varied according to the viscosity or fluidity desired in the finished material.

The type of plasticizer used in the preferred form of this invention is the so-called "solvent-plasticizer". Materials which have been found useful in this invention other than those mentioned in the above examples are dibutyl tartrate, triacetin, tributyl phosphate, cyclohexyl adipate, phthalic acid esters of methyl, ethyl, butyl, amyl alcohols and of the higher aliphatic alcohols, aliphatic ethers, and phthalic acid esters of cyclohexanol, and paratoluene sulfonamide and its derivatives. These can be used either singly or in combination. The active solvents and diluents employed are those generally used for preparing cellulose nitrate dispersions and may be varied over wide limits, such limits and choice of materials being known to those skilled in the art.

The viscosity characteristic of the cellulose nitrate is not critical, the choice depending largely on the viscosity desired for the finished adhesive, however, the nitrogen content of the cellulose nitrate is important, and best results are obtained when this value is between 9.5% and 11.5%. Good results are also obtained where the nitrogen content lies between 11.5% and 12% and acceptable compositions may be prepared with nitrocellulose of nitrogen content up to 12.5%. However, nitrocelluloses of nitrogen content below 12% are definitely preferred.

It is of advantage to use nitrocelluloses in the lower nitrogen range for two reasons: first, because at a given plasticizer-nitrocellulose ratio, a cement made from the lower nitrogen content nitrocellulose will have greater thermoplasticity, i. e., it will become softer at a given temperature or soften at a lower temperature, and second, it has been found that the lower nitrogen nitrocelluloses will tolerate more plasticizer, i. e., a greater ratio of plasticizer can be compounded with them without producing a sticky or tacky film. This is of considerable importance where brief or extended storage of the coated surfaces is necessary before they are laminated.

The compositions may be modified by the addition of substances which are inert so far as thermoplastic properties are concerned, for example refined de-waxed shellac may be used, or other materials, for example certain natural resins such as dammar or ester gums, dyes, or pigments.

The natural resin which may be added plays no substantial part in providing heat energizability, its only function being to promote adhesion when the adhesives are used in connection with metal surfaces. While dammar and ester gums are thermoplastic to a certain extent in themselves, it has been found that their action in these compositions which contain the solvent-plasticizers, is to dilute the solvent plasticizer and thus somewhat lower its thermoplastic action.

The uses of this invention are readily apparent and particularly useful in cementing regenerated cellulose sheeting together or in forming moisture proof containers therefrom. It is equally satisfactory in joining paper, cardboard, metal foils, wood, leather, fabrics, all kinds of cloth, glassine, or any combination of such materials.

This invention presents as an advantage over other types of adhesives the production of practically colorless compositions which have greater utility in conjunction with adhering colorless or light colored materials. The adhesives are also substantially odorless and tasteless, thus widening the scope of their usefulness. The adhesives produced are permanently flexible and not affected by temperature changes particularly lowered temperatures. A further advantage is that materials which it is ultimately desired to adhere can be coated and stored until such time as it is desired to carry out the combining operation. This is a decided advantage over the use of regular adhesives which require immediate adhesion to another surface after being applied to a surface which will form part of the finished combined product.

It is apparent that many widely different embodiments of this invention may be made without departing from the spirit and scope thereof and, therefore, it is not intended to be limited except as indicated by the appended claims.

I claim:

1. The process of laminated materials which comprises coating at least one surface of the materials to be joined with a thermoplastic adhesive which when free of volatile solvents is soft and sticky above about 130° C., said adhesive aside from volatile solvents consisting of nitrocellulose having a viscosity characteristic less than 80 seconds and a nitrogen content between 9.5% and 11.5% and a solvent plasticizer present in amount of about twice that of the nitrocellulose, allowing the adhesive to dry and subsequently joining the parts by means of heat and pressure.

2. A laminated article comprising at least two non-thermoplastic components joined by means of a thermoplastic adhesive which is soft and sticky above about 130° C. and which consists essentially of nitrocellulose having a viscosity characteristic below 80 seconds and a nitrogen content between 9.5% and 11.5% and a solvent plasticizer for the nitrocellulose, said plasticizer being present in amount of about twice the amount of nitrocellulose.

3. The article of claim 2 in which at least one of the components is cloth.

4. The article of claim 2 in which at least one of the components is regenerated cellulose.

5. The article of claim 2 in which at least one of the components is paper.

JOHN P. SERMATTEI.